Figure 1:
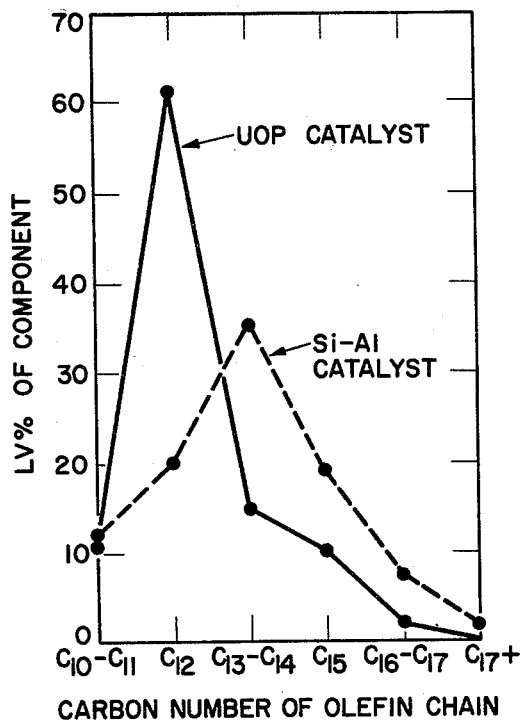

June 8, 1965   D. A. GUDELIS   3,188,360
PROPYLENE POLYMERIZATION TO $C_{13}$-$C_{20}$ OLEFINS FOR DETERGENTS
Filed Feb. 2, 1961

David A. Gudelis   Inventor

By Frank A. Simmock
Patent Attorney

United States Patent Office 3,188,360
Patented June 8, 1965

3,188,360
PROPYLENE POLYMERIZATION TO $C_{13}$–$C_{20}$
OLEFINS FOR DETERGENTS
David A. Gudelis, Sarnia, Ontario, Canada, assignor to Esso Research and Engineering Company, a corporation of Delaware
Filed Feb. 2, 1961, Ser. No. 86,790
12 Claims. (Cl. 260—683.15)

The present invention relates to a process for the polymerization of propylene to obtain selectively large amounts of $C_{13}$–$C_{20}$ olefins. More particularly this invention relates to polymerizing propylene in the presence of silica alumina catalysts at temperatures in the range of 200 to 600° F. Most particularly in a preferred embodiment this invention relates to utilizing cracking catalysts, either fresh or equilibrium (spent) cracking catalysts, preferably fresh catalysts, to obtain selective polymerization to $C_{13}$ to $C_{20}$ olefins which are useful in the preparation by alkylation and sulfonation of synthetic alkyl aryl detergents.

The active organic surfactant in commercial household synthetic detergents is normally a sodium alkyl benzene sulphonate prepared by the steps of (1) polymerizing propylene in the presence of phosphoric acid on kieselguhr catalysts, (2) alkylating benzene with the olefin polymer so prepared, (3) sulfonating the alkylate, and finally (4) neutralizing with sodium hydroxide. The prior art catalysts used in the polymerization step produce predominantly dodecylbenzene, (i.e. the propylene tetramer) and the alkyl benzene alkylate so prepared has an average molecular weight of about 246. Recently commercial demand has strongly shifted in favor of a somewhat heavier product of around 268 average molecular weight for which $C_{13}$ to $C_{16}$ olefins are required. The superiority of the detergent prepared from these heavier olefins in washing properties is well established and these olefins now command a premium price on the market.

Until the present only small amounts of this material were available, obtainable as a byproduct in the conventional process above described and no processes for producing this material selectively had been developed. Attempts to recycle $C_9$ to $C_{12}$ material to increase the yield of the $C_{13}$ to $C_{16}$ material were in general unsuccessful. Also, in the conventional process although the light polymer boiling below tetra-propylene is ordinarily recycled this also does not appreciably increase the amount of $C_{13}$ to $C_{16}$ material obtained.

It has now surprisingly been discovered that utilizing particular silica alumina catalysts, generally anhydrous conditions and preferably a $C_4$ to $C_{16}$ paraffin diluent at the reaction conditions described in this invention, both high conversions and high selectivities to $C_{12}$ to $C_{17}$ olefins may be obtained. In the prior art the use of silica alumina catalysts for accelerating a wide variety of hydrocarbon reactions have been described, e.g. these catalysts are commercially used in catalytic cracking of gas oils etc. to lower olefins and other products. However, in polymerization using these catalysts in general only either lower olefins boiling principally below $C_{12}$ or heavy oils and solids polymer boiling above the presently desired $C_{12}$ to $C_{17}$ olefins have been obtained. Additionally these process in generally have been commercially of little interest due to the rapid deactivation of catalyst encountered.

It has now been discovered that the desired $C_{13}$ to $C_{16}$ product distribution, high olefin conversions, and long catalyst life are obtained utilizing the present catalyst by carefully controlling the composition and heat activation of the catalyst, preferably the water content of the feed, and preferably also using a $C_4$ to $C_{16}$ parafin diluent.

The silica-alumina catalysts which may be used in the present process contain a ratio of silica to alumina of 1:1 to 15:1 and preferably contain from 50 to 90% silica and from 50 to 10% alumina. Usually the silica-alumina catalyst contains a predominant weight concentration of silica and has a silica: alumina weight ratio ranging from >1 to 15:1. In addition small amounts, i.e. not more than 10%, of other metal oxides such as iron and nickel may be present but are only coincidental in the success of the present process. These catalysts may be prepared by methods well known in the art such as by impregnating silica with alumina salts, by directly combining precipitated hydrated alumina and silica or by joint precipitation of alumina and silica from aqueous solutions of their salts. Following this initial step in the preparation of the catalyst the catalyst is washed, dried and heated to activate the catalyst. This heating of the catalyst is essential to obtain the desired structure and acidity of the catalyst for optimum activity and selectivity in the process. Thus, the catalyst is heated at temperatures in the range of 300 to 1500° F., preferably 900 to 1100° F., e.g. 1000° F., preferably with hot air for times in the range of ½ to 25 hours, preferably 1 to 3 hours, e.g. 2 hours to obtain a surface area of about 350 m.²/g., preferably about 450 m.²/g., e.g. 500 m.²/g.

The catalyst may be used either in the form of pellets for fixed or moving bed processes or in the form of powder for fluidized operations. Where the catalyst is used in the form of pellets, these catalysts may be prepared by pelleting to form preferably ⅛" to ½" pellets, e.g. 3/16" pellets, followed by heating as previously described to activate the catalyst.

It should be noted that a preferred embodiment the same catalyst may be used in both a fluidized bed catalytic cracking process and in the present process in a combined operation. Thus, spent catalyst from both processes may be commingled and continuously passed to the same regeneration facilities. If desired, of course, the regenerated catalyst to be passed to the present process may be additionaly dried and activated by heating as is described herein, before being passed to the polymerization reactor.

The silica alumina catalysts used in this invention are preferably fresh catalysts but in addition may less preferably be "spent" or "equilibrium" cracking catalysts which have been used in the cracking of hydrocarbons, e.g. gas oils to produce lower boiling materials. These cracking operations are commercially conducted, e.g. at temperatures of 800 to 1200° F., e.g. 1070° F., and pressures of 10 to 500 p.s.i.g., e.g. 200 p.s.i.g. In these processes activity of the catalyst progressively decreases due to the accumulation of coke and other materials thereon. Such catalysts are ordinarily continuously regenerated in the process by burning off the deposited coke at temperatures usually of less than about 1150° F., e.g. 950° F., in a stream of air which may be diluted with an inert gas in order to control the rate of burning. Regeneration processes, however, do not completely restore the catalyst to its original activity and regeneration becomes progressively less effective. This effect is due to in part to the deposition of foreign materials principally metals or metal compounds on the catalyst which are not removed in the regeneration process. Additionally the surface area of the catalyst progressively decreases. When the cracking activity after regeneration has decreased from 70 to 50% of its original activity regeneration thereof is no longer feasible and the catalyst is referred to as "spent catalyst" and is discarded. Such catalysts orindarily have surface areas of about 100 m.$^2$/g. which surface areas are of course far below optimum for the present process. Catalysts having an activity of above 50 to 70% of original activity are referred to as "equilibrium" catalysts and these catalysts may be used in the process (although of course surface area for these catalysts also will be low). A typical spent catalyst containing 87% $SiO_2$ and 13% $Al_2O_3$ when fresh may contain when "spent" 1 to 5% iron and 0 to 1% nickel as impurities. In this invention, however, the amount and nature of the metallic impurities is of little consequence.

Propylene feed stocks for the present process may be in general any propylene containing stream available in the refinery such as from steam cracking and catalytic cracking processes. These feed streams will in general contain 30 to 100 volume percent, preferably 50 to 100 volume percent, e.g. 90 volume percent propylene. Preferred feed streams from steam cracking may contain 80 to 98 volume percent, preferably 90 to 95 volume percent, e.g. 92 volume percent propylene and 20 to 2 volume percent, preferably 10 to 5 volume percent, e.g. 8 volume percent propane. Preferred feed stocks from catalytic cracking may contain 50 to 70 volume percent, preferably 55 to 65 volume percent, e.g. 58 volume percent propylene, and 50 to 30 volume percent, preferably 45 to 35 volume percent, e.g. 42 volume precent propane. These feed streams may be mixed together if desired. Preferably these feed streams are diluted with propane to dilute the propylene to 20 to 50 volume percent, preferably 20 to 35 volume percent, e.g. 25 volume percent, to thereby control the exothermic polymerization reaction.

Alternatively or additionally to the propane diluent in a preferred embodiment a higher $C_4$ to $C_{16}$ paraffin, preferably a $C_6$ to $C_{10}$ paraffin, e.g. a $C_7$ paraffin, is supplied to the reaction zone. This paraffin may be a normal paraffin, an isoparaffin, or a cycloparaffin or a mixture of paraffins. It is preferred to utilize a feed containing large amounts of propylene and only small amounts of propane, e.g. a feed from steam cracking, with the higher paraffin above referred to as the only (unreactive) diluent. The amount of the higher paraffin diluent, if one is utilized, will be 10 to 80 wt. percent, preferably 30 to 60 wt. percent, e.g. 50 wt. percent. By utilizing this higher molecular weight diluent the yield of undesirable heavy polymer is greater reduced without at the same time reducing the amount of the desired $C_{13}$ to $C_{17}$ olefins obtained. Thus, the useful light polymer is increased proportionately. This is a surprising and important discovery in the present process which further adds to its economic desirability. Additionally considerably higher conversions are so obtained which further adds to this preferred embodiment.

According to the present invention reaction conditions should be temperatures in the range of 200 to 500° F., preferably 375 to 425° F., e.g. 400° F., pressures of 300 to 1500 p.s.i.g., preferably 500 to 800 p.s.i.g., e.g. 800 p.s.i.g., space valocities of 0.05 to 0.80 g.p.h./lb. of catalyst, preferably 0.08 to 025 g.p.h/lb. of catalyst, 0.15 g.p.h./lb. of catalyst. The catalyst will ordinarily be regenerated after a catalyst life of about 50 to 100 gallons polymer/lb. catalyst, preferably about 60 to 80 gallons polymer/lb. of catalyst, e.g. 75 gallons/polymer/lb. of catalyst. This regeneration is conducted at temperatures in the range of 800 to 1500° F., preferably 900 to 1200° F., e.g. 1000° F. for contacting times of 2 to 20 hours, preferably 5 to 10 hours, e.g. 8 hours. Shorter times are of course used with the higher temperatures. This contacting is preferably conducted in the presence of an inert gas and if it is desired to burn off carbon also in the presence of air. The temperatures described above are critical in order to obtain the preferred structure of the catalyst following regeneration.

In the present process the reaction is preferably carried out under generally anhydrous conditions. Thus, the amount of water present in the reaction zone is preferably less than 100 p.p.m., preferably 10 to 70 p.p.m., e.g. 30 p.p.m. These low water contents must usually be obtained by drying the feed. Usually it is preferred to conduct the selective polymerization using feeds having less than 50 parts per million (p.p.m.) of water based on total feed. This drying may be obtained with conventional drying agents, such as molecular sieves, activated carbon, etc. It should also be noted that in the catalyst regeneration step further drying of the catalyst may be obtained by expedients such as drying the gases supplied to the regenerator and additionally stripping the catalyst following regeneration with dry gases to remove any water formed in the regeneration step from the combustion of carbon.

Unconverted propylene may be separated from the reaction products and recycled to the reactor. Additionally lower and higher polymer, i.e. boiling below and above the desired $C_{13}$ to $C_{16}$ material may be recycled to the process to increase the yields of the desired products. In preferred embodiments the recycle may be propylene and $C_4$ to $C_9$ materials, propylene and $C_4$ to $C_{10}$, propylene and $C_4$ to $C_{11}$ materials, etc.

In another preferred embodiment the low boiling polymer boiling below $C_{11}$, preferably below $C_{10}$, from a conventional phosphoric acid on kieselguhr polymerization process, preferably $C_5$ to $C_{10}$ olefins, e.g. $C_4$ to $C_9$ olefins, may be supplied with the propylene to the process of the present invention. It is noted that these by-product materials from the conventional process are of little value other than as fuels, etc. and that contrary to the present process recycle of these materials in the conventional phosphoric acid on kieselguhr process does not appreciably increase the yield of the $C_{13}$ to $C_{15}$ materials.

Alkylation is carried out utilizing benzene or less preferably toluene, in the presence of Friedel-Crafts type catalyst at temperatures in the range of −10 to 70° C., e.g. 10° C. Preferred catalysts are for example $AlCl_3$, HF, $BF_3$ and $AlBr_3$, polyphosphoric acid, $H_2SO_4$ and aluminum chloride hydrocarbon complexes.

It is generally desirable to maintain in the reaction mixture a volume ratio of aromatic hydrocarbon to olefin of at least 3:1, e.g. 5:1, although ratios up to 20:1 may be used.

In the case of utilizing catalysts such as $AlCl_3$, $BF_3$, etc. preferably $AlCl_3$, it is preferred to utilize in one embodiment mild conditions of 5 to 20° C., e.g. 10° C., and in another embodiment conventional conditions of 20 to 60° C., e.g. 45° C. In both of these embodiments weight ratios of olefin to catalyst are in the range of 30:1 to 10:1, e.g. 20:1. Additionally in the case of the use of aluminum chloride an activator such as HCl may be added in an amount of from 15 to 40 wt. percent, e.g. 20 wt. percent, based on aluminum chloride.

In utilizing the liquid hydrogen fluoride catalyst it is preferred to use an acid to hydrocarbon reactants volume ratio of 0.1:1 to 1.0:1, e.g. 0.3:1 and temperatures in the range of 0 to 15° C., e.g. 10° C. The concentration of this catalyst may range from 85% to 100% HF by weight, its water content being maintained very low, e.g. no higher than 1 or 2 percent by weight, the remander being dissolved hydrocarbon material.

The alkylated aromatic fraction is recovered from the alkylation reaction mass and is sulfonated in known manner, e.g. by contact with an excess of concentrated sulfuric acid, oleum, $ClSO_3H$, sulfur trioxide, etc. The sulfonation may be carried out at temperatures up to 60° C., preferably for oleum 15° C. to 60° C., e.g. 50° C. The acid concentration is preferably at least 97%. Acid up to 100% concentration and preferably oleum containing up to e.g. 20 wt. percent $SO_3$ or higher, may be employed. With higher acid concentration, lower reaction times are required, e.g. about 3 to 4 hours with 98% acid, about 2 hours with 100% acid, and preferably 0.5 to 1 hour, e.g. 0.7 hours with oleum. Volume ratios of sulfuric acid to hydrocarbon may range from 0.8:1 to 1.25:1, a 1:1 ratio being suitable. The larger the ratio, the more inorganic sulfate will be present in the product following neutralization. In many cases, the inorganic sulfate is a desirable constituent of the finished detergent composition.

The sulfonation product mixture may be separated by "layering" to remove part of the excess spent acid before neutralizing or may be neutralized directly. When neutralized, the sulfonic acids are thus converted to sulfonic acid salts and the excess sulfuric acid into sulfate. The neutralization may be carried out with any base or basic-reacting inorganic or organic substance. Thus, to produce sodium sulfonates, aqueous sodium hydroxide or sodium carbonates are suitably employed. Other alkali metal, alkaline earth metal, ammonium or amine salts may be similarly produced from the corresponding basic compounds. The neutralization is generally carried out by contact with basic aqueous solution at temperatures of from 20° to 70° C., those between 30° and 50° C., e.g. 50° C., being preferred.

The present invention will be more clearly understood from a consideration of the following examples.

EXAMPLE I

A propylene stream containing 62 wt. percent propylene and 38 wt. percent propane was polymerized over various heat treated pelleted silica alumina catalysts containing 12 wt. percent alumina at a temperature of 400° F., pressures of 800 p.s.i.g., utilizing a liquid hydrocarbon space velocity of 0.13 g.p.h./lb. of catalyst. The following data were obtained showing the effect of catalyst surface area on olefin conversion.

*Effect of catalyst surface area on olefin conversion*

| Surface area, m.$^2$/g | 411 | 375 | 300 | 40 |
|---|---|---|---|---|
| Propylene conversion, wt. percent | 71 | 60 | 30 | 12 |
| Yield of 360–500° F. ($C_{11}$–$C_{17}$) fraction on $C_3^=$, LV percent | 23 | 19 | 5 | 2 |

From the above data it can be seen that surface area of at least 400 meters$^2$/gram is required to give highest olefin conversion.

EXAMPLE II

A propylene stream containing 62 wt. percent propylene and 38 wt. percent propane was polymerized over a heat treated pelleted silica alumina catalyst containing 12 wt. percent alumina and having a surface area of at least 380 m.$^2$/g. at a temperature of 400° F., pressures of 800 p.s.i.g., utilizing a liquid hydrocarbon space velocity of 0.13 g.p.h./lb. of catalyst. The following data were obtained showing the effect of water content of the feed on olefin conversion.

*Effect of water content of the feed on olefin conversion*

| Water content of feed, p.p.m. | 100 | | 10 | |
|---|---|---|---|---|
| Hours on stream | 5 | 40 | 5 | 40 |
| Propylene conversion, wt. percent | 70 | 25 | 100 | 70 |
| Yield of 360–500° F. fraction on $C_3^=$, LV percent | 18 | 6 | 35 | 25 |

From the above data it can be seen that highest catalyst activity is obtained and maintained by utilizing low water content feeds, preferably below 50 p.p.m.

EXAMPLE III

A propylene stream containing 62 wt. percent propylene, 38 wt. percent propane and about 10 p.p.m. of water was polymerized over a heat treated pelleted silica alumina containing 12 wt. percent alumina and having a surface area of at least 400 m.$^2$/g. at the temperatures shown in the following table, pressures of 800 p.s.i.g., utilizing a liquid hydrocarbon space velocity of 0.13 g.p.h./lb. The following data were obtained showing the effect of temperature on olefin conversion.

*Effect of temperature on olefin conversion*

| Temperature, ° F. | 350 | 400 | 500 |
|---|---|---|---|
| Propylene conversion, wt. percent | 29 | 54 | 81 |
| Yield of 360–500° F. fraction on $C_3^=$, LV percent | 10 | 16 | *22 |

*Considerable coke formation was noted visually.

From the above data it can be seen that the temperature is a critical factor in obtaining the desired polymerization. Thus at 350° F. very little polymerization takes place and at 500° F. high yields are obtained but the catalyst is subject to rather rapid deactivation due to coke formation.

EXAMPLE IV

A propylene stream containing 62 wt. percent propylene and 38 wt. percent propane and about 10 p.p.m. of water was polymerized over a heat treated pelleted silica alumina catalyst containing 12 wt. percent alumina and having a surface area of at least 400 m.$^2$/g. at a temperature of 400° F., pressures of 800 p.s.i.g. at the space velocities shown in the following table. The following data were obtained showing the effect of space velocity on the yield of 500° F.+ fraction.

*Effect of space velocity on the yield of 500° F.+ fraction*

| Catalyst type | Equilibrium | | Fresh | |
|---|---|---|---|---|
| Space velocity, g.p.h./lb. | 0.11 | 0.24 | 0.10 | 0.24 |
| Yield of 360–500° F. fraction on $C_3^=$, LV percent | 20 | 20 | 25 | 25 |
| Yield of 500° F.+ fraction on $C_3^=$, LV percent | 17 | 5 | 21 | 13 |

From the above data it can be seen that yields of the presently less desirable 500° F.+ fraction (which may in the future become suitable for use in soluble sulfonates, lubricating oil, additives, plasticizers, etc.) may be maintained as low as possible by increasing the space velocity or decreasing the residence times. Further, it should be noted that each particular catalyst gives a different yield of the 500° F.+ fraction.

EXAMPLE V

A propylene stream containing 62 wt. percent propylene and 38 wt. percent propane, and about 10 p.p.m. of water was polymerized over a heat treated pelleted silica alumina catalyst containing 12 wt. percent alumina and having a surface area of at least 400 m.$^2$/g. at a temperature of 400° F., pressures of 800 p.s.i.g., utilizing a liquid hydrocarbon space velocity of 0.13 g.p.h./lb. The following data were obtained showing the effect of light polymer recycle boiling $C_5$–360° F. on the 360–500° F.+ fraction yield.

*Effect of light polymer recycle on the 360–500° F.+ fraction yield*

| Recycle on $C_3^=$, LV percent | 0 | 54 | 100 | 185 | 54* |
|---|---|---|---|---|---|
| Yields on propylene, LV percent: | | | | | |
| 360–500° F. | 28 | 39 | 47 | 71 | 25 |
| 500° F.+ | 17 | 24 | 27 | 39 | 34 |

*$C_5$–360° F. polymer from commercial polymerization of propylene over a phosphoric acid on kieselguhr catalyst.

From the above data it can be seen that recycling light polymer boiling $C_5$–360° F. increases the yield of the 360–500° F. polymer fraction up to 70 LV percent on propylene. However, as shown by the data additionally light polymer from a conventional polymerization of propylene over phosphoric acid on kieselguhr may also be added to the feed to increase the yield of the desired 360–500° F. polymer.

EXAMPLE VI

A typical $C_{10}$–$C_{17+}$ polymer fraction obtained from the process described in Example I in connection with the high surface area catalyst was analyzed to determine the amount of components which are even multiples of a propylene unit and the amount of the other components boiling between these materials. The data are described in FIGURE 1. It thus can be seen that an entirely different product is obtained utilizing the catalyst of the present invention both as to higher average molecular weight products being obtained and as to larger amounts of non-propylene multiple components being obtained. Most important it should be noted that from the conventional phosphoric acid on kieselguhr catalyst process the yield of desired $C_{13}$–$C_{16}$ olefins is only about 30 liquid volume percent as compared to the approximately 60 to 65 liquid volume percent obtained with the present silica alumina catalysts. Further as can be seen the alkyl aryl detergents prepared from any fraction of the present olefins have entirely different structure characteristics from the prior art conventionally prepared detergents. Additionally, as will be shown the present detergents have equivalent or superior detergency.

EXAMPLE VII

Figure 2:
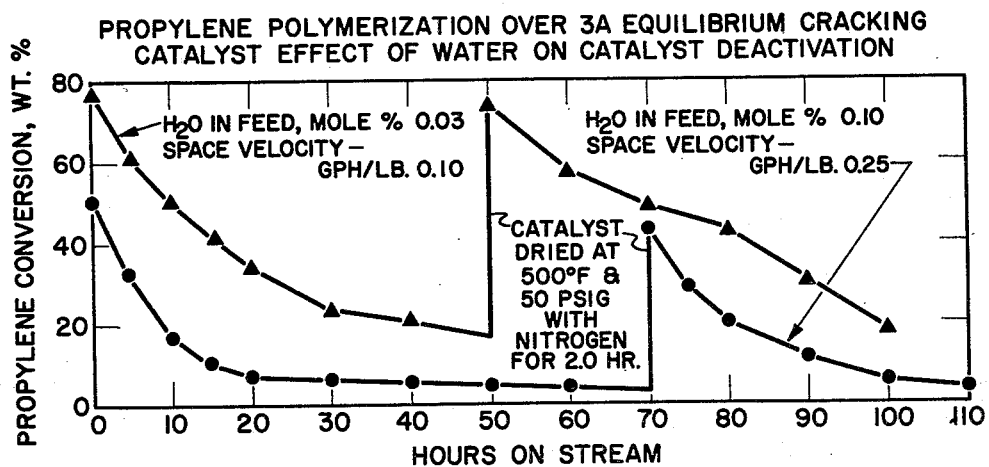

Propylene containing 63 wt. percent propylene, the remainder being propane, was polymerized in two runs at temperatures of 400° F., utilizing a pressure of 800 p.s.i.g. In the first run water in the feed was 0.10 mol percent and the space velocity was 0.25 g.p.h./lb. and in the second run water in the feed was 0.03 mole percent and the space velocity was 0.10 g.p.h./lb. Data are reported in FIGURE 2. This data shows that the catalyst is essentially fully regenerable by heating and drying.

EXAMPLE VIII

The following data were obtined showing the effect of various feed compositions and catalysts showing the yields of the various fractions in the $C_6$–500° F.+ boiling range.

It thus can be seen that good yields are obtained using both equilibrium and fresh catalysts.

EXAMPLE IX

Additional data were obtained showing the effect of the feed composition and diluent used on product yields utilizing various silica alumina catalysts.

*Propylene polymerization over silica-alumina catalyst*

| Catalyst type | 12% $Al_2O_3$ [1] | | | 12% $Al_2O_3$ [2] | | 12% $Al_2O_3$ [3] |
|---|---|---|---|---|---|---|
| Pressure, p.s.i.g | 800 | 800 | 800 | 800 | 800 | 800 |
| Temperature, ° F | 400 | 400 | 400 | 400 | 400 | 400 |
| LHSV, g.p.h./lb | 0.13 | 0.13 | 0.12 | 0.17 | 0.18 | 0.17 |
| Conversion, wt. percent | 71 | 71 | 100 | 70 | 60 | 30 |
| Feed composition, wt. percent: | | | | | | |
| Propane | 5 | 2 | 2 | 3 | 2 | 3 |
| Propylene | 95 | 47 | 44 | 60 | 31 | 58 |
| Isobutane | | 51 | | 37 | 67 | 39 |
| n-Heptane | | | 54 | | | |
| Total polymer distribution by 15/5 fractionation, LV percent: | | | | | | |
| $C_5$–360° F | 30 | 43 | 51 | 55 | 64 | 62 |
| 360–400° F | 10 | 12 | 12 | 9 | 10 | 6 |
| 400–500° F | 22 | 20 | 19 | 16 | 12 | 9 |
| 500° F.+ | 38 | 25 | 18 | 20 | 14 | 9 |

[1] 411 m.²/g.
[2] 375 m.²/g.
[3] 300 m.²/g.

EXAMPLE X

A 400–550° F. ($C_{12-13}$–$C_{18}$ olefin fraction) obtained by polymerizing propylene as described in Example I, column 1 was used to alkylate benzene in the presence of an $AlCl_3$-HCl catalyst in a bench scale unit. Alkylation conditions were

| | |
|---|---|
| $AlCl_3$ addition rate | 12 wt. percent on olefin. |
| HCl addition rate | 20 wt. percent on $AlCl_3$. |
| Benzene/olefin volume ratio | 5:1. |
| Reactor temperature | 50° F. |

The yield of detergent alkylate (640–675° F. material) was found to be 72.0 liquid volume percent based on olefin. This alkylate was sulfonated with 20% oleum at 15 to 60° C. by adding the oleum to the alkylate. The weight ratio of oleum to hydrocarbon was 1.4:1 and the materials were reacted for 45 minutes. Following reaction, the sulfonation product mixture was neutralized to a pH of 7 with 30% aqueous sodium hydroxide to obtain the sodium salts of the sulfonic acids admixed with sulfates produced from excess spent sulfuric acid. The neutralization was carried out at temperatures of about 45° C. utilizing a reaction time of about 15 minutes.

The following detergent properties were found as compared to the detergent properties of a detergent derived from a $C_{13}$–$C_{16}$ olefin cut from phosphoric acid on keiselguhr process.

*Propylene polymerization over silica-alumina catalysts*

| Catalyst type | Equilibrium 13% $Al_2O_3$* | Fresh 25% $Al_2O_3$* | | 13% $Al_2O_3$* | | 12% $Al_2O_3$* | |
|---|---|---|---|---|---|---|---|
| Pressure, p.s.i.g | 800 | 800 | 800 | 800 | 800 | 800 | 800 |
| Temperature, ° F | 350 | 400 | 500 | 400 | 400 | 400 | 400 |
| LHSV, g.p.h./lb | 0.25 | 0.24 | 0.25 | 0.10 | 0.24 | 0.11 | 0.13 |
| Conversion, wt. percent | 29 | 54 | 81 | 63 | 53 | 79 | 71 |
| Feed composition, wt. percent: | | | | | | | |
| $C_2$ | 38 | 5 | 5 | 36 | 38 | 5 | 5 |
| $C_3$ | 62 | 95 | 95 | 64 | 62 | 95 | 95 |
| Total polymer distribution by 15/5 fractionation, LV percent: | | | | | | | |
| $C_6$–360° F | 50 | 62 | 57 | 34 | 39 | 44 | 30 |
| 360–400° F. ($C_{11}$–$C_{12,13}$) | 17 | 14 | 10 | 11 | 12 | 13 | 10 |
| 400–500° F. ($C_{12,13}$–$C_{16}$) | 16 | 15 | 17 | 21 | 25 | 22 | 22 |
| 500° F.+ | 17 | 9 | 16 | 34 | 24 | 21 | 38 |

*At least 400 m.²/g. surface area.

| Detergent performance | No. of dishes washed | |
|---|---|---|
| | Si-Al prepared | $H_3PO_4$ prep. |
| 120° F., 0.01 wt. percent active ingredient | 13 | 14 |
| 80° F., 0.03 wt. percent active ingredient | 9 | 9 |

What is claimed is:

1. A process for polymerizing propylene selectively to large amounts of $C_{13}$–$C_{20}$ olefins which comprises reacting propylene in the presence of a silica alumina catalyst containing a predominant weight concentration of silica and a silica:alumina weight ratio ranging from >1 to 15:1 and having a surface area of above 350 m.$^2$/g. at temperatures in the range of 375 to 425° F. at essentially anhydrous reaction conditions of less than 100 parts per million of water and pressures ranging from 300 to 1500 p.s.i.g.

2. The process of claim 1 in which additionally 10 to 80 wt. percent based on propylene of a $C_6$–$C_{10}$ paraffin diluent is present in the reaction zone.

3. A process as in claim 1 wherein less than 50 parts per million of water, based on total feed, is present.

4. The process of claim 3 in which a dilute propylene stream containing 20 to 90 volume percent propylene and 80 to 10 volume percent propane is supplied to the process.

5. The process of claim 3 in which the silica-alumina catalyst contains 50 to 90 wt. percent silica and is activated by heating at temperatures in the range of 300 to 1200° F. for 2 to 16 hours.

6. The process of claim 4 in which the reaction is carried out in a fixed bed process utilizing a pelleted catalyst.

7. The process of claim 4 in which the reaction is carried out in a fluidized bed system and in which a portion of the catalyst is continuously withdrawn, regenerated, and recycled to the process.

8. The process of claim 3 in which the catalyst is present as a fixed bed and is periodically reactivated by heating at temperatures in the range of 600 to 1000° F. for 2 to 16 hours.

9. The process of claim 8 in which, during reactivation, carbon is also burned from the catalyst by supplying controlled amounts of oxygen in an inert gas during heating.

10. The process of claim 8 in which the onstream time between reactivations expressed as catalyst life is 50 to 100 gallons of total polymer/lb. of catalyst.

11. The process of claim 3 in which additionally 10 to 80 wt. percent based on propylene of a $C_6$–$C_{10}$ paraffin diluent is present in the reaction zone.

12. A process as in claim 1 wherein $C_4$–$C_{11}$ propylene polymer olefin fraction is admixed with the propylene to be polymerized, said $C_4$–$C_{11}$ propylene polymer olefin fraction undergoing additional reaction to form $C_{13}$–$C_{20}$ olefin selectively.

References Cited by the Examiner

UNITED STATES PATENTS

| | | | |
|---|---|---|---|
| 2,617,839 | 11/52 | Moore et al. | 260—683.15 |
| 2,806,875 | 9/57 | Geiser | 260—505 |
| 2,820,056 | 1/58 | Gerhart et al. | 260—505 |
| 2,825,721 | 3/58 | Hogan et al. | 260—683.15 |
| 2,845,463 | 7/58 | Friedman et al. | 260—683.15 |
| 2,822,325 | 4/59 | Luvisi et al. | 260—671 |
| 2,897,246 | 7/59 | De Keizer et al. | 260—671 |
| 2,910,515 | 10/59 | Luvisi et al. | 260—671 |
| 2,918,507 | 12/59 | Kennedy et al. | 260—683.15 |
| 2,949,492 | 8/60 | Weaver | 260—671 |
| 2,967,206 | 1/61 | Stuart et al. | 260—683.15 |
| 2,993,941 | 7/61 | Warner | 260—683.15 |
| 3,047,644 | 7/62 | Winnick | 260—683.15 |

ALPHONSO D. SULLIVAN, *Primary Examiner.*

CHARLES B. PARKER, PAUL M. COUGHLAN,
*Examiners.*